United States Patent [19]
Campbell et al.

[11] Patent Number: 5,148,323
[45] Date of Patent: Sep. 15, 1992

[54] LOCAL REFERENCE BEAM GENERATOR

[75] Inventors: Blair F. Campbell, Malibu; Richard B. Holmes, Woodland Hills; Sam S. Ma, Agoura; Dennis M. Guthals, Thousand Oaks, all of Calif.

[73] Assignee: Rockwell International Corporation, Seal Beach, Calif.

[21] Appl. No.: 743,054

[22] Filed: Aug. 9, 1991

[51] Int. Cl.$^5$ .............................................. G06K 9/08
[52] U.S. Cl. ................................... 359/738; 359/558; 359/740
[58] Field of Search ............... 359/738, 739, 740, 741, 359/568, 569, 358, 559, 562

[56] References Cited

U.S. PATENT DOCUMENTS

| | | | |
|---|---|---|---|
| 3,608,992 | 9/1971 | Phelps | 359/11 |
| 3,630,593 | 12/1971 | Bartelt et al. | 359/11 |
| 3,838,903 | 10/1974 | Leith et al. | 359/12 |

*Primary Examiner*—Janice A. Howell
*Assistant Examiner*—Don Wong
*Attorney, Agent, or Firm*—H. Fredrick Hamann; Harry B. Field

[57] ABSTRACT

A filtering apparatus 30 passes an incident beam of light through a first lens having a first focal length, causing the incident beam of light 32 to be focussed, and then passes the incident beam of light through a pinhole 36 having an opening of a predetermined size. In accordance with one aspect of the invention, the pinhole 36 is spaced from the first lens 34 by a distance which is greater than, or less than, but not equal to the lens' focal length wherein only a portion of the incident beam of light passes through the opening of the pinhole 36. In the illustrated embodiment, the pinhole 36 has a size which is significantly larger than the nominal diffraction limited spot size of the first lens 34. The incident beam of light which passes through the pinhole is then directed toward a second lens 38 having a second focal length. In a preferred embodiment, the second lens 38 is spaced from the pinhole 36 by a distance substantially equal to the second lens' focal length. Because of the increased size of the pinhole and the non-focal length spacing between the pinhole and the first lens 34, the pinhole 36 is able to block substantially all of the phase varying portion of the wavefront of the incident beam yet the sensitivity of the filter to intensity variations and component misalignments is substantially reduced.

21 Claims, 2 Drawing Sheets

MODIFIED SPATIAL FILTER

STANDARD SPATIAL FILTER

MODIFIED SPATIAL FILTER

MODIFIED SPATIAL FILTER

LOCAL REFERENCE BEAM GENERATOR

BACKGROUND OF THE INVENTION

1. Field of the Invention

The present invention relates to optical filters and beam generators and, in particular, to spatial optical filters for obtaining substantially plane-wave reference beams that have temporal coherence with a prespecified information bearing beam of optical light.

2. Description of Related Art

One application for optical filters and beam generators is in optical holography which is a technique for obtaining phase information from a signal light beam. The basic principles of holography are well known for infrared, visible and ultraviolet light sources. A hologram is formed when two light beams are caused to interfere within a holographic medium, that is, a medium which can be made to record the intensity distribution o an incident light field. Typically, a hologram is formed when a signal beam carrying phase information interferes with a reference beam. The reference beam comprises a plane wave or nearly plane wave light, that is, light having a substantially constant phase and intensity across its wavefront. For the signal beam to interfere with the reference beam, the two light beams must be temporally coherent with each other.

For the purposes of this application, two light beams are temporally coherent if, when the beams are combined, the beams will interfere to form interference fringes. It is recognized that this definition encompasses a range of coherence from beams that are perfectly coherent to beams that are only partially coherent, but have sufficient spatial and temporal coherence to form interference fringes.

One well known way of obtaining a reference beam that is spatially and temporally coherent with a signal beam is to derive the reference beam from the same light source as that used to form the signal beam. This technique is described herein in a simplistic fashion to illustrate the very general area of the problem to which this invention is directed. In certain types of holography, lasers are used as light sources because they provide monochromatic light with a long temporal coherence length. Light from a laser beam is spatially filtered and then passed through a beam splitter to form two beams, one of which becomes the signal beam, the other of which becomes the reference beam. At this point both beams are plane waves. The signal beam then travels along some optical path in which it either passes through an aberrator or is reflected off an aberrator. In this process the aberrator modulates the signal beam so that phase or intensity information characteristic of that aberrator is incorporated into the signal beam. After the signal beam interacts with the aberrator, it is usually no longer a plane wave. The signal beam is then directed to the holographic recording medium where it will be combined with the reference beam.

After the reference beam leaves the beam splitter, it travels an optical path whose length is adjusted to match the length of the signal beam path. The lengths of the respective paths travelled by the signal beam and the reference beam are matched to ensure that the beams remain temporally coherent. Ideally, the reference beam should not interact with the aberrator or any other medium which might introduce a phase variation across the wavefront of the reference beam. The reference beam thus remains a plane wave until it is directed to the holographic recording medium where it combines with the signal beam, creating interference fringes within the holographic medium, and forming a hologram. The hologram then bears information characteristic of the aberrator and the hologram can then be used to recreate the image of the aberrator.

While such an independent reference beam can be used in a laboratory environment, such a technique may not be feasible when the holography is performed over large distances. For example, it may be impractical to match the reference beam's optical path length to that of the signal beam. Additionally, such a technique may yield a reference beam that is not optimally suited to this type of holography. Optical delay lines can be used to create a local reference beam, but a reference beam produced in that fashion may not be ideal for extracting information about a particular aberrator from the signal beam. This is because frequency or phase shifts might be present in the signal beam that will not be present in a local reference beam. When the signal beam interferes with the local reference beam, any frequency shifts or phase shifts that have occurred along the signal beam optical path will degrade the quality of the resultant interference fringes.

An example of such a phase or frequency shifting problem occurs in the atmosphere. The atmosphere can act as an aberrator, diminishing the spatial coherence of a signal beam with a local reference beam. A light beam back scattered from the atmosphere can be Doppler shifted and or Doppler broadened sufficiently to affect the coherence of that beam with a reference beam generated in an optical delay line. If the signal beam and the local reference beam travel substantially different paths, the two beams may not produce strong interference fringes when they are combined.

One technique for addressing this problem is to derive the necessary reference beam from the signal beam after the signal beam has travelled whatever optical path it is constrained to travel, and has interacted with the various aberrators along the signal beam optical path. This technique is known as "self-referencing" because holograms can be produced without having an independent reference beam travel a path similar to that travelled by the signal beam. In the self-referencing technique, a portion of the signal beam is split off from the signal beam by, for example, a beam splitter. The split off beam is then spatially filtered to remove the phase information from that beam, creating a plane wave that is spatially and temporally coherent with the signal beam. This beam can then serve as a reference beam which, when combined with the signal beam, will interfere so that a hologram can be formed.

A substantial disadvantage with this technique is that self-referencing cannot typically be performed with low light level signals. This is because losses of 99% or greater are associated with the spatial filtering typically performed to obtain the reference beam. Optimal conditions for holography require that the power in the signal beam and the reference beam be equal to maximize the contrast between fringes. Thus a 99% loss in reference beam intensity will cause a greater than one order of magnitude drop in the signal available to form the hologram.

In one prior art self-referencing technique, the beam split off from the signal beam is spatially filtered with a filter comprised of two lenses and a pinhole as shown in FIG. 1. In operation, an incident beam of light is focussed at the pinhole by one lens. The diameter of the pinhole is typically chosen as the diffraction limited spot size associated with the wavelength of the light in the signal beam and the size and focal length of the second lens of the spatial filter. The pinhole is usually located at the focus of the first lens, i.e., at a distance equal to the focal length $f_1$ of that lens. After the beam of light passes through the first lens and the pinhole, the beam is collimated by passing it through the second lens. The second lens is positioned so that the pinhole is at the focus of the second lens, that is, the distance between the pinhole and the second lens is equal to the focal length $f_2$ of the second lens.

Typically, the spatial filter illustrated in FIG. 1 must be carefully aligned because the light intensity throughput usually drops rapidly for even small misalignments. Also because of the criticality of the alignment of this device, this spatial filter can be prone to losses due to misalignments which occur as a result of vibrations. Yet another disadvantage of this spatial filtering technique is the vulnerability of the pinhole to damage. In this spatial filter, the beam of light is normally focussed to as small of a spot as is possible, creating a high level of optical power density at the pinhole. For high power applications, this can cause damage to the pinhole.

This spatial filtering technique has a further, often critical disadvantage when used to produce a self-referencing beam for holography of distant or atmospheric objects. Light which passes through a strongly-aberrating medium is subject to rapid variations in spatial phase caused by variations in the density of the air through which the light passes. For light that has passed through the atmosphere, these variations in phase will cause rapid variations in the observed optical intensity which are known as scintillations. When a self-referencing beam is derived from a beam of light that has passed through the atmosphere, the beam will tend to drift in position and will suffer from strong intensity modulation at the spatial filter plane. These scintillations result in an often unacceptable level of variation in the reference beam power, limiting the self-referencing beam's usefulness for holography.

SUMMARY OF THE INVENTION

It is an object of the present invention to provide an improved spatial filter and beam generator in which phase variations are filtered from an incident optical beam, particularly in a manner requiring a relatively uncomplicated electrical and optical arrangement.

This and other objects and advantages are achieved with a filtering apparatus which first passes an incident beam of light through a first lens having a first focal length, causing the incident beam of light to be focussed, and then passes the incident beam of light through a pinhole having an opening of a predetermined size. In accordance with one aspect of the invention, the pinhole is spaced from the first lens by a distance which is greater than, or less than, but not equal to the lens' focal length wherein only a portion of the incident beam of light passes through the opening of the pinhole. In the illustrated embodiment, the pinhole has a size which may be equal to or significantly larger than the nominal diffraction limited spot size. The incident beam of light which passes through the pinhole is then directed toward a second lens having a second focal length. In a preferred embodiment, the second lens is spaced from the pinhole so that the pinhole forms a substantially unresolved source for the second lens.

Because of the increased size of the pinhole and the non-focal length spacing between the pinhole and the first lens, the pinhole is able to block substantially all of the phase varying portion of the wavefront of the incident beam yet the sensitivity of the filter to intensity variations and component misalignments is substantially reduced.

As explained in greater detail below, the filter of the present invention may be used to provide a reference beam for use in optical holography. This reference beam is derived from an incident signal beam, and through the method of the present invention, a plane wave reference beam is formed that is spatially and temporally coherent with the incident signal beam. The reference beam produced by this method can have sufficient optical power to perform optical holography in which it is combined with the signal beam to produce interference fringes. In a preferred embodiment, a coherent optical amplifier may be used to amplify this reference beam to match the intensity of the incident signal beam.

In an alternate embodiment of the modified spatial filter, the pinhole is located at the focus of the first lens. The pinhole is preferably made larger than the nominal diffraction limited spot size, and the second lens is chosen to have a much longer focal length than in the first embodiment. In this configuration the pinhole does not block substantially all of the phase varying portion of the wavefront. Instead, the phase varying portions of the wavefront are diffracted at a sufficiently large angle so that those portions of the wavefront primarily do not strike the second lens. As a consequence, the light incident upon the second lens has a substantially plane wave nature only.

Embodiments of the present invention are described in detail below with reference to the drawings included in this application.

DETAILED DESCRIPTION OF THE DRAWINGS

As set forth above, optical holography is a technique for obtaining phase information from a signal light beam. A hologram is formed when two light beams, a reference beam and a signal beam, are caused to interfere within a holographic media, that is, a media which can be made to record the intensity distribution of an incident light field. The signal beam typically carries phase variations which are characteristic of an aberrator of the signal beam has passed through. The reference beam is typically a plane wave and is directed to the holographic recording media where it combines with the signal beam, creating interference fringes within the holographic media, and forming a hologram.

The hologram thus formed bears information characteristic of the aberrator and can be used to create an image of the aberrator.

To ensure that the signal and reference beams remain coherent, one approach has been to ensure that the two beams are made to travel substantially similar paths. Because it is not always practical for the signal and reference beams to travel independent similar optical paths, it is sometimes desirable to generate the necessary reference beam from the signal beam. This self-referencing technique is usually performed by splitting off a portion of the signal beam and spatially filtering the split off beam, thereby creating a substantially plane wave reference beam that is coherent with the signal beam. Previously, this self-referencing technique often was not suitable for use in low light level applications due to the often large losses associated with that technique and due to the throughput variations caused by scintillations.

Figure 1:
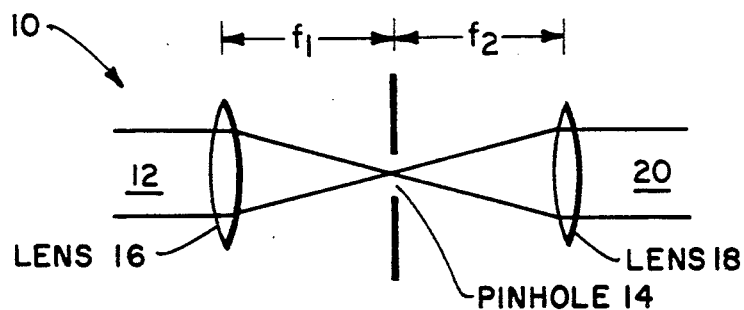
FIG. 1 is a schematic representation of a prior art spatial filtering technique.

In one prior art self-referencing technique, the beam split off from the signal beam is spatially filtered with a filter comprised of two lenses and a pinhole, as indicated generally at 10 in FIG. 1. In this prior art spatial filtering technique, an incident beam of light 12 is focussed onto a pinhole 14 by a first lens 16. The opening of the pinhole 14 is typically chosen to be the diffraction limited spot size associated with the wavelength of the light in the signal beam and the size and focal length of the first lens 16 of the spatial filter. The pinhole 14 is located at the focus of the first lens 16, at a distance equal to the focal length f of that lens. After the beam of light passes through the first lens 16 and the pinhole 14, the beam is collimated by passing it through a second lens 18. The second lens 18 is positioned so that the pinhole 14 is at the focus of the second lens, that is, the distance between the pinhole and the second lens is equal to the focal length $f_2$ of the second lens.

The lenses described above and throughout the rest of this application can be single element focussing lenses or other, more complicated combinations of optical elements. For example, compound lenses may be desirable to provide greater imaging resolution. Such lenses are well known and are not the subject matter per se of this application.

In practice, the spatial filter 10 illustrated in FIG. 1 generally must be carefully aligned because the light intensity throughput drops rapidly for even small misalignments. Also because of the careful alignment required by this device, this spatial filter is often prone to losses due to misalignments which occur as a result of vibrations. Yet another disadvantage of this spatial filtering technique is the vulnerability of the pinhole to damage. In this prior art spatial filter, the beam of light is generally focussed to as small of a spot as possible, creating a high power density at the pinhole. For high power applications, this can cause damage to the pinhole.

This spatial filtering technique typically has a further, critical disadvantage when used to produce a self-referencing beam for holography of distant objects. Light transmitted over long distances typically passes through a range of different densities of air, with each density having an associated different refractive index. One common source of such different air densities is atmospheric turbulence. These different densities of air can alter the direction of a beam of light passing through the atmosphere and can cause local focussing and defocussing known as scintillations. In turn, such directional shifts and scintillations can produce variations in the observed intensity of a beam of light. When a self-referencing beam is derived from a beam of light that has passed through the atmosphere, the beam will often exhibit intensity variations caused by atmospheric turbulence. Scintillations often produce an unacceptable level of variation in the reference beam power, limiting the self-referencing beam's usefulness for holography.

The present invention is directed to an improved reference beam generator which addresses inadequacies of previous self-referencing techniques, allowing the self-referencing technique of the present application to be applied to low light level holography and atmospheric holography. One embodiment of the reference beam generator of the present invention is comprised of a modified spatial filter in combination with an optical amplifier. A modified spatial filter in accordance with a preferred embodiment of the present invention is indicated generally at 30 in FIG. 2. As is explained in greater detail below, the filter 30 can accommodate scintillations and minor variations in the position of a light beam by incorporating an enlarged pinhole that is displaced away from the focus of the entrance lens of the spatial filter.

Typically, the light beams used for holography are substantially monochromatic and have a relatively high level of coherence. Often these beams are generated from light produced by lasers, since laser light can be made to have the desirable narrow bandwidth, long coherence length, and high optical power levels. Other light sources are suitable if light from that source can be made to produce stable interference fringes.

Figure 2:
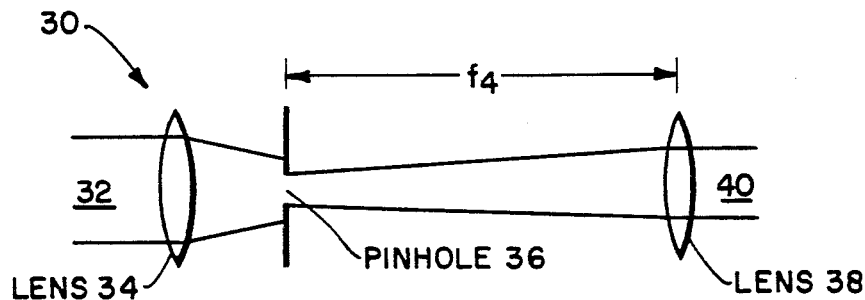
FIG. 2 shows a spatial filter in accordance with a preferred embodiment of the present invention.

As shown in FIG. 2, a beam of light 32 enters the modified spatial filter 30 at a first lens 34 which has a focal length $f_3$. The beam of light is diffracted onto a pinhole 36 which preferably has an opening larger than the diffraction limited spot size associated with the wavelength of the incident light and the size and focal length of the first lens 34. In a preferred embodiment according to this invention, the opening of pinhole 36 is two to three times larger than the diffraction limited spot size. In this spatial filtering technique, the pinhole may be located outside the focus of the first lens or the pinhole may be separated from the first lens by less than the first lens focal length $f_3$. In a preferred embodiment of this invention, the pinhole 36 is displaced inside of the focal length of the lens so that the pinhole 36 is separated from the first lens 34 by less than the first lens focal length $f_3$. This placement yields a shorter optical path length which produces a more compact spatial filter, which is preferable to a larger device. The pinhole is situated away from the focus of the first lens by as much as 15% of the focal length $f_3$ of the first lens in this illustrated embodiment.

The position of the pinhole 36 should be adjusted so that the pinhole blocks the phase varying portion of the wavefront while the pinhole opening allows a near constant phase portion of the wavefront to pass through. This placement will allow the incident beam to be spatially filtered sufficiently so that it is very nearly a plane wave when it reaches the second lens 38. The nearer the pinhole is to the first lens, the more planar the filtered wave will be. On the other hand the nearer the pinhole 36 is to the first lens 34, the less power will be transmitted. Thus, the optimal position of the pinhole is determined by balancing the power requirements for the reference beam with the desired extent of spatial filtering. The exact placement of the pinhole, as well as the size of the pinhole opening, will thus depend on the exact nature of the application. Standard spatial filters, such as that illustrated by FIG. 1, typically use a pinhole with an opening substantially equal to the diffraction limited spot size determined for that wavelength light and the size and focal length of the spatial filter's first lens. This modified spatial filter design has been successfully implemented using a pinhole 36 with an opening two to three times the diffraction limited spot size, with the pinhole 36 located as near as 85% of $f_3$ away from the first lens 34.

In general, displacing the pinhole 36 away from the focus of the first lens 34 places a limitation on the size of the pinhole opening. Light incident to the first lens 34 can be characterized by a spatial coherence length $r_0$ which describes the coherence of that light beam across its wavefront. The opening of the pinhole is preferably no larger than $r_0$ times the fraction of the first lens focal length $f_3$ that the pinhole is displaced toward the first lens 34.

After the beam passes through the first lens 34 and through the pinhole 36, the beam passes through a second lens 38 which collimates the beam. The second lens 38 is separated from the pinhole 36 by the focal length $f_4$ of the second lens. The opening of pinhole 3 should preferably be unresolvable by the second lens 38. In a preferred embodiment according to this invention, the opening of pinhole 36 is smaller than the diffraction limited spot size for the second lens 38. In this manner, the opening of the pinhole 36 acts as an unresolved source for the second lens 38. By choosing the focal length of each lens 34 and 38 the beam width can be increased or decreased as desired.

Figure 3:
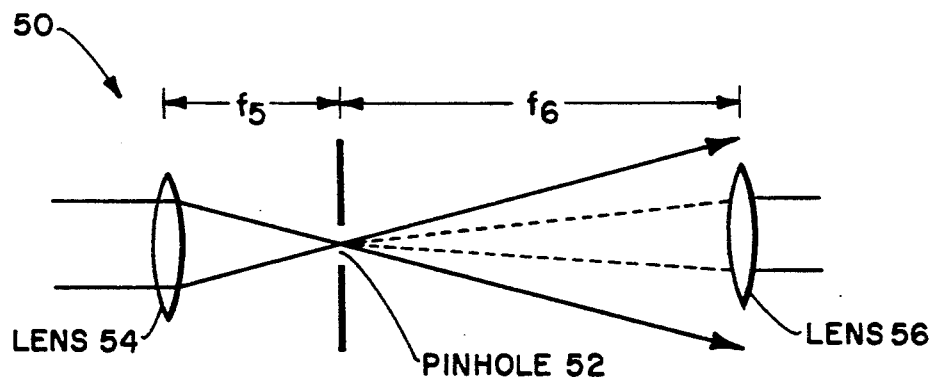
FIG. 3 shows a spatial filter in accordance with an alternate embodiment of the present invention.

In an alternate embodiment of the modified spatial filter, indicated generally at 50 of FIG. 3, a pinhole 52 is located at the focus of a first lens 54. The pinhole 52 is made to be larger than the nominal diffraction limited spot size associated with the standard spatial filter 10, and the second lens 56 is chosen to have a much larger focal length than in the nominal, prior art spatial filter. In this configuration the pinhole 52 does not block substantially all of the phase varying portion of the incident wavefront. Instead, some of the phase varying portions of the wavefront are blocked and others of the phase varying portions are diffracted at sufficiently large angles so that those portions do not strike the second lens 56. In this way substantially the only light that strikes the second lens 56 has a substantially plane wave nature.

The modified spatial filter comprised of a first lens, larger opening pinhole and second, collimating lens is less sensitive to variations in the incident beam position and to localized scintillation than the standard spatial filter indicated at 10 in FIG. 1. Thus, the modified spatial filter is better adapted to use with signal beams that are subject to atmospheric scintillations. Similarly, the alignment of these elements is typically less critical than it is for the standard spatial filter. Furthermore, since the pinhole is displaced from the focus of the first lens, the power density at the pinhole is lowered, reducing the possibility of power damage to the pinhole.

While the modified spatial filter of the present invention can limit the level of intensity fluctuations that occur when a self-referencing beam is formed by the present method, the level of power lost at the pinhole often can be relatively large. Thus, for many low light level applications, it may be desirable to provide a coherent optical amplifier after the modified spatial filter in the optical path. To be suitable for holography purposes, an optical amplifier should preserve the spatial and temporal coherence of the light beam. Furthermore, an optical amplifier for holography purposes should preserve the phase and the frequency of the light passing through it. It is also desirable for the optical amplifier to have very low noise to facilitate its use with low light signals. Also, a fast response time is desirable so that the reference beam produced is suitable for real time holography.

Figure 4:
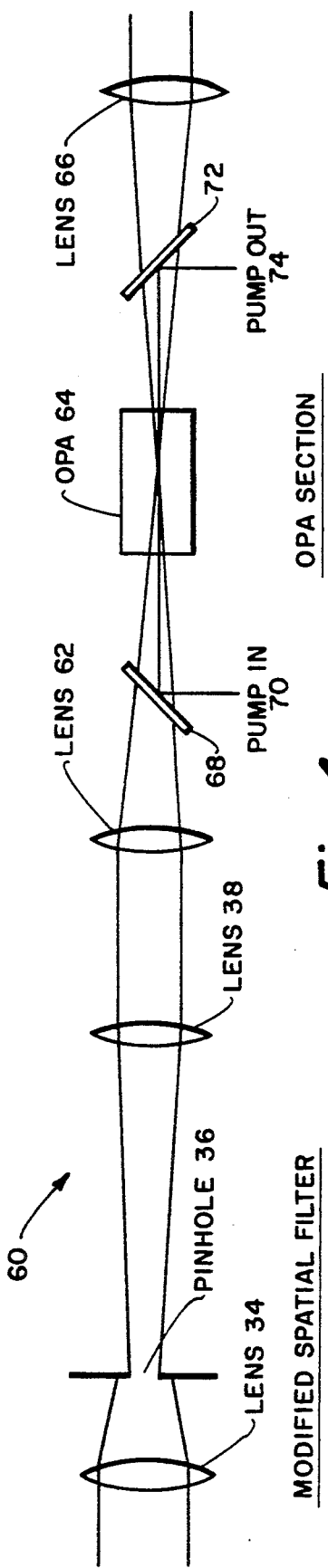
FIG. 4 illustrates a local reference beam generator in accordance with a preferred embodiment of the present invention, comprising the spatial filter of FIG. 2 and an optical parametric amplifier.

In a preferred embodiment of the local reference beam generator, an optical parametric amplifier (hereinafter, "OPA") is used to amplify the reference beam. The amplifier is preferably placed after the modified spatial filter to minimize the possibility of damaging the pinhole by exposing it to excessive power densities. The OPA is not the only optical amplifier that is suitable for use in the local reference beam generator, but it does have certain advantages for low light level and atmospheric holography. First, the OPA is capable of providing a high level of gain for low power input signals. Also, in this application, the OPA is a quantum noise limited amplifier. Finally, when the OPA is operated in the saturation mode, the OPA acts to smooth intensity variations. The use of an OPA within a preferred embodiment of this invention is described below with reference to FIG. 4 which shows one embodiment of the local reference beam generator, indicated generally at 60 in FIG. 4, in accordance with the present invention.

After the reference beam has been collimated by the second lens 38 of the modified spatial filter 30, the beam passes through a third lens 62 which focusses the reference beam inside of the crystal of an OPA 64. The beam passes through the OPA, where it is amplified, and then passes through to a fourth lens 66 where the beam is once again collimated. The fourth lens 66 is positioned so that the OPA is at one focus of the fourth lens.

Between the third lens 62 and the OPA 64, the reference beam passes through a beam combining element 68 where an OPA pump beam 70 is made collinear with the reference beam optical path. The OPA pump beam 70 should pass through the portion of the OPA crystal where the reference beam is focussed. The beam combining element 68 may take several forms including various types of beam splitters and pick off mirrors. Preferably, the combining element 68 would (1) transmit a high proportion of light having a wavelength near the wavelength $\lambda_1$ of the reference beam light and (2) reflect a high proportion of light having a wavelength near the wavelength $\lambda_2$ of the OPA pump beam. To conserve the intensity of the reference and signal beam, and because high power pump lasers are available, condition (1) is the more important.

After the reference beam is amplified, it passes through to a beam separating element 72. This element has different optical requirements than the beam combining element 68. An important characteristic of the beam separating element 72 is its efficiency in removing the OPA pump beam light from the reference beam optical path. This is because the sensitivity of the holographic media down the optical path from the OPA would be diminished if the OPA pump beam were allowed to pass through to it. Thus, beam separating element 72 should be highly reflective at the OPA pump beam wavelength $\lambda_2$, so that the OPA pump beam is dumped out of the optical beam path as waste light 74. A less important condition is the efficiency of the beam separating element 72 in transmitting the reference beam. This is because the reference beam has been highly amplified and, given the gain of an OPA, there should be ample power for holographic purposes. Still, it is desirable that beam separating element 72 should transmit a high proportion of the reference beam.

The OPA 64 is operated in the difference frequency generation mode and may, for example, be comprised of a KDP (potassium dihydrogen phosphate) crystal being pumped by the second harmonic of a Nd-YAG laser. Because of the nature of the OPA, the OPA pump laser should have a shorter wavelength than the reference beam, that is $\lambda_2 > \lambda_1$. The operation of an OPA as an optical amplifier is well known in the art, so the details of its operation are not discussed here. A number of different OPA amplifiers have been used with essentially equivalent success. A number of other phase and frequency preserving optical amplifiers might be used in place of an OPA. For example, amplifiers based on stimulated Raman scattering as well as amplifiers based on four wave mixing would be suitable for use in the local reference beam generator.

One characteristic of the OPA that is advantageous to its use herein is that the OPA acts to smooth output intensity variations when it is operated in the saturated mode. An important advantage of the implementation of the modified spatial filter in this design is the limitation of undesirable intensity fluctuations in a reference beam so that it is well suited to holography. The OPA can complement the modified spatial filter in reducing intensity fluctuations. For a range of reference beam input intensities, the saturated mode OPA will amplify the reference beam to a certain level that is relatively constant. The output intensity from the saturated OPA is relatively insensitive to the input intensity.

Figure 5:
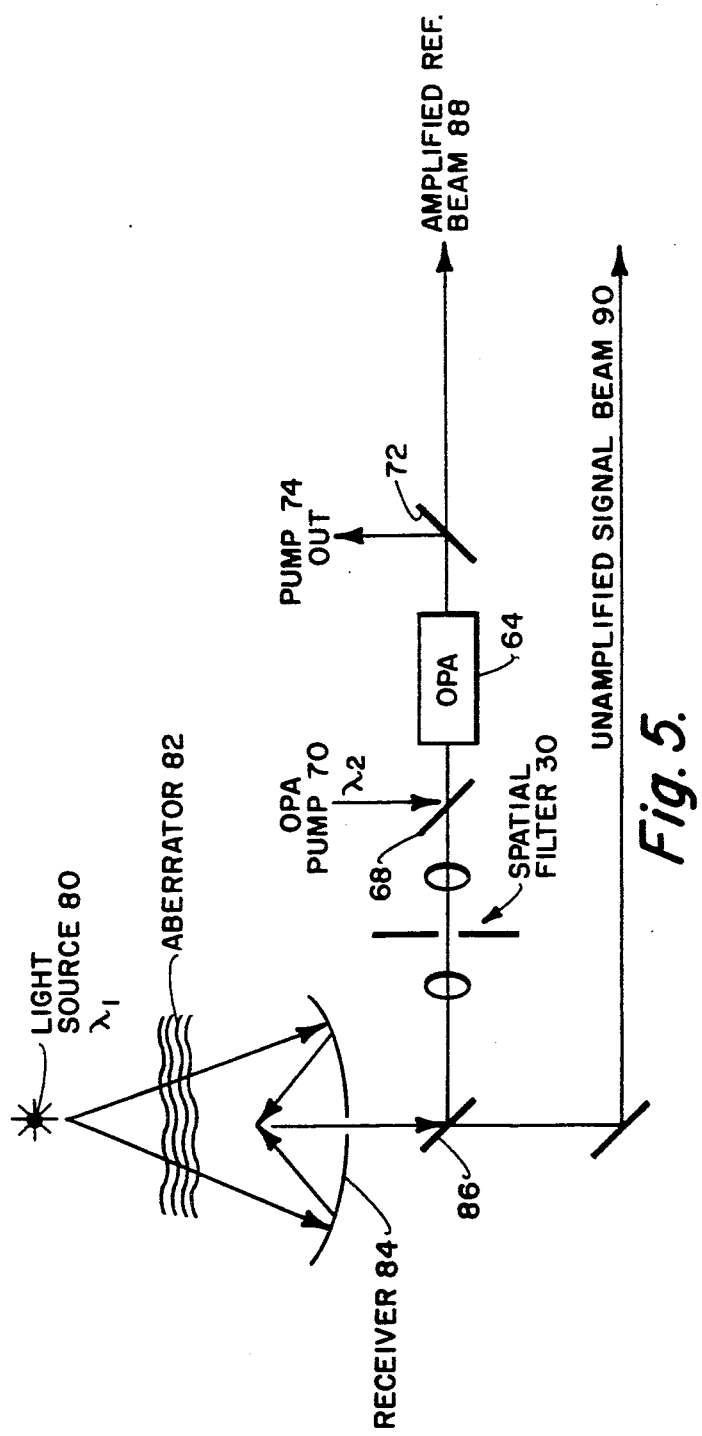
FIG. 5 is a schematic representation of the local reference beam generator of FIG. 4 being used to perform holography.

An example of the operation of the local reference beam generator to perform holography is described below with reference to FIG. 5. Light from a distant light source 80 passes through an aberrator 82 and is collected by an aperture 84. The phase characteristics of the aberrator are derived by performing holography of the beacon light that has passed through the aberrator 82. A hologram resulting from such a technique comprises a phase description of the aberrator 82 which can be used to reproduce an image of the aberrator. The light collected by receiving lens 84 is focussed, collimated and directed into a beam splitter or pick off mirror 86 where the light is separated into a reference beam and a signal beam. The reference beam then passes through the local reference beam generator which produces a highly amplified reference beam 88 that is substantially a plane wave and is coherent with the unamplified signal beam 90. Thereafter, the reference beam is directed to the holographic media where the hologram will be formed.

To retain temporal coherence between the signal beam and the generated reference beam, the optical path lengths travelled by the two beams must be equal to within a coherence length of the signal light beam. The other well known requirements for optical holography must also be met when combining the signal beam and the reference beam to form a hologram. Of course, the technique described above need not be used to form a hologram. It may be used to simply create interference fringes between an incident signal beam and a locally generated reference beam.

Maximum fringe contrast is obtained when the power in the reference beam is equal to the power in the signal beam. Thus, the beam splitting element 86 is often chosen so that it is adjustable. With the high gain from the OPA, however, additional attenuation and adjustment capability is also typically desirable. To this end, an optical attenuator may be placed in the optical path of the reference beam. After the reference beam has been amplified by the OPA, it would then pass through the optical attenuator which would be chosen so as to equalize the reference beam power with the signal beam power.

The above invention has been described with reference to certain preferred embodiments. The teachings of this invention are applicable, for example, to applications in which plane wave light is to be derived from light that has phase variations across its wavefront. As illustrated above, these applications include optical holography. The local reference beam generator can be used in place of a standard spatial filter, and is particularly useful in low light level applications. It is to be understood that what has been described is merely illustrative of the principles of the invention and that numerous arrangements in accordance with this invention may be devised by one skilled in the art without departing from the spirit and scope thereof.

WHAT IS CLAIMED IS:

1. A method for filtering an incident beam of light comprising the steps of:

passing said incident beam of light through a first lens having a first focal length, thereby causing said incident beam of light to be focussed;

passing said focussed incident beam of light through a pinhole, said pinhole having an opening of a predetermined size and being spaced from said first lens by a first separation distance, said first separation distance being different from said first focal length by some fraction of said first focal length, wherein only a portion of said focused incident beam of light passes through said opening of said pinhole; and passing at least a portion of said incident beam of light from said pinhole toward a second lens, said second lens having a second focal length, said second lens being spaced from said pinhole by a distance substantially equal to said second focal length, wherein at least a portion of said incident beam of light is passed through said second lens to form a substantially collimated plane wave beam of light.

2. The method of claim 1 further comprising the step of passing said substantially collimated plane wave beam of light through a phase preserving and frequency preserving optical amplifier so that said substantially collimated plane wave beam of light is amplified within said optical amplifier.

3. The method of claim 1 wherein said first separation distance is less than said first focal length.

4. The method of claim 3 wherein said first separation distance is approximately 85% of said first focal length.

5. The method of claim 2 wherein said phase preserving and frequency preserving optical amplifier is an optical parametric amplifier.

6. The method of claim 1 wherein said incident beam is generated by a laser.

7. The method of claim 1 wherein said predetermined size of the pinhole opening is larger than the diffraction limited spot size as determined by the wavelength of said incident beam and the size and focal length of said first lens.

8. The method of claim 1 wherein said predetermined size of the pinhole opening is substantially equal to two to three times the diffraction limited spot size a determined by the wavelength of said incident beam and the size and focal length of said first lens.

9. A method for filtering an incident beam of light comprising the steps of:

passing said incident beam of light through a first lens having a first focal length, thereby causing said incident beam of light to be focussed;

passing said focussed incident beam of light through a pinhole, said pinhole having an opening of a predetermined size and being spaced from said first lens by a distance substantially equal to said first focal length wherein said focussed incident beam of light passing through said pinhole has a substantial non-plane wave component diffracted by the pinhole; and passing at least a portion of said incident beam of light from said pinhole toward a second lens, said second lens having a second focal length and being spaced from said pinhole by a distance substantially equal to said second focal length, wherein the second focal length is sufficiently large so that a substantial portion of the diffracted non-plane wave component does not strike the second lens and wherein at least a portion of said incident beam of light is passed through said second lens to form a substantially collimated plane wave beam of light.

10. The method of claim 9 wherein said predetermined size of the pinhole opening is substantially larger than the diffraction limited spot size as determined by the wavelength of the incident beam and the size and focal length of said first lens.

11. The method of claim 10 wherein said predetermined size of the pinhole opening is approximately two to three times the diffraction limited spot size as determined by the wavelength of said incident beam and the size and focal length of said first lens.

12. The method of claim 9 further comprising the step of passing said substantially collimated plane wave beam of light through a phase preserving and frequency preserving optical amplifier so that said substantially collimated plane wave beam of light is amplified within said optical amplifier.

13. An apparatus for filtering an incident beam of light comprising:

a first lens having a first focal length;

a pinhole having an opening of a predetermined size, said pinhole being spaced from said first lens by a first separation distance, said first separation distance being different from said first focal length by some fraction of said first focal length; and a second lens having a second focal length, said second lens being spaced from said pinhole by a distance substantially equal to said second focal length;

wherein said first lens, said pinhole and said second lens define an optical path and wherein a portion of said incident beam of light passing through said first lens, said pinhole and said second lens along said optical path forms a substantially plane wave beam of light.

14. The apparatus of claim 13 further comprising a phase preserving and frequency preserving optical amplifier positioned within the optical path of said first lens, said pinhole and said second lens;

wherein a portion of said substantially plane wave beam of light passes through said optical amplifier so that said substantially plane wave beam of light is amplified within said optical amplifier.

15. The apparatus of claim 13 wherein said first separation distance is less than said first focal length.

16. The apparatus of claim 15 wherein said first separation distance is approximately 85% of said first focal length.

17. The apparatus of claim 14 wherein said phase preserving and frequency preserving optical amplifier is an optical parametric amplifier.

18. The apparatus of claim 13 wherein the incident beam is generated by a laser.

19. The apparatus of claim 13 wherein said predetermined size of the pinhole opening is larger than the diffraction limited spot size as determined by the wavelength of said incident beam and the size and focal length of said first lens.

20. The apparatus of claim 19 wherein said predetermined size of the pinhole opening is substantially equal to two to three times the diffraction limited spot size as determined by the wavelength of said incident beam and the size and focal length of said first lens 21. The apparatus of claim 19 wherein said incident beam of light has a spatial coherence length $r_0$ and said predetermined size of the pinhole opening is less than $r_0$ times the fraction of said first focal length by which said first separation distance is different from said first focal length.

* * * * *